United States Patent Office 2,955,283
Patented Oct. 4, 1960

2,955,283

METHOD AND APPARATUS FOR SIGNALING THE POSITIONS OF A MOVING OBJECT

Hans Busch-Keiser, Werkstrasse 1, Chur, Switzerland

Filed Apr. 17, 1958, Ser. No. 729,166

Claims priority, application Switzerland Apr. 18, 1957

2 Claims. (Cl. 340—282)

The present invention refers to signaling the positions of a moving object, particularly of a member of a measuring device.

More specifically, the invention concerns a method and an apparatus for indicating the positions of a moving object carrying a series of reference marks lined up along a line extending substantially in the direction of movement of the object.

The present invention has particular significance for devices, particularly measuring devices as for instance scales, which are equipped with a dial or a graduation on a member which moves into various positions relative to a starting position, depending upon the values measured or otherwise determined by the operation of the particular device.

It is desirable in many cases to signal or otherwise transmit the measured values or indication of the measuring instrument or of similar devices, to a different device or to a person located remote from the location of the particular measuring device or the like, or not present at this location for directly reading the indication of the measuring device.

Again, in many such cases it is not even desirable to make available or to transmit an image of the particular dial or scale and of the indicating member associated therewith. It is rather desired to transmit or to signal the result of the measuring operation which is usually a multi-digit figure. The transmission of such a result figure may be desired in form of a readable, optical indication, in the form of an imprint on a recording strip, or in some other similar suitable manner.

To achieve this, it is usually necessary to convert a rectilinear or rotary movement of the dial or scale, or of its indicator means, into a corresponding movement of members of an indicating device capable of indicating the above-mentioned multi-digit figure.

Various devices and methods are known which have been developed for transmitting a result figure from a measuring device to some indicating means. However, these known devices are not entirely satisfactory because they comprise quite involved mechanisms and are therefore expensive and delicate. If the movement of the dial or scale of the measuring device is sensed mechanically, then the result of the measuring operation is easily affected and not correctly transmitted. Photo-electrical scanning methods for determining and transmitting the position of individual graduation lines of a moving scale have proven unsatisfactory because the resulting apparatus becomes much too involved if large numbers, as for instance 1000 graduation lines, have to be handled and differentiated from each other.

Considerably better results are obtained by arranging on the moving scale or graduation member a series of reference marks and by counting the number of such reference marks passing by a stationary reference mark so that the sum of reference marks counted during the movement of the member carrying said reference marks would indicate the position of the carrier member with respect to the stationary reference mark.

However, difficulties result from the fact that sometimes, particularly in the case of weighing scales, the member carrying the reference marks does not move from a starting position directly to a position indicating a definite weight, but rather moves first beyond the final indication point, then swings back a certain amount and only thereafter moves into the final indicating position which is located between the first position reached in the first forward swing and the second position reached in the first backward swing. It is evident that ordinary counting devices provided for counting the number of reference marks of the carrier passing by the stationary mark may easily fail because the summing up operation has to change between additive and subtractive operations, and because the switching from adding to subtracting and vice versa must be expected to introduce errors into the final result.

It is therefore a main object of this invention to provide for a method and an apparatus which avoids all the deficiencies of known methods and apparatus.

It is another object of this invention to provide for a method and an apparatus which is entirely reliable and yet comprises comparatively simple steps and devices for accomplishing the desired result.

With above objects in view, the present invention, in one aspect thereof, mainly consists in a method of signaling the positions of a moving object, particularly of a member of a measuring device, comprising the steps of illuminating the moving object; generating a sequence of light pulses each correspondnig to an illuminated reference mark on the moving object passing by a stationary reference mark; converting said sequence of light pulses into a sequence of electrical pulses of same pulse frequency; separating said electrical pulses into first pulses of a predetermined polarity and corresponding to light pulses generated during movement of said moving object in one direction, and into second pulses of the same polarity and corresponding to light pulses generated during movement of said object in the opposite direction; and introducing said first and second pulses into a counting device capable of summing up additively the number of said first pulses and subtractively the number of said second pulses, whereby the position assumed by the moving object with reference to a starting position is indicated by the final sum of first and second pulses appearing as output of said counting device.

In another aspect, the present invention mainly consists in an apparatus for signaling the positions of a moving object, particularly of a member of a measuring device, carrying a series of reference marks lined up along a line extending substantially in the direction of movement of said object which comprises, in combination, sensing means located adjacent to said moving object and capable of sensing said reference marks during their movement both in one and the opposite direction and of generating an electric pulse for each of said reference marks consecutively sensed during said movement. The converter means are connected in circuit with said scanning means and are capable of converting said electric pulses into first indicator signals representing electric pulses generated by movement of reference marks in one direction, and into second indicator signals representing electric pulses generated by movement of reference marks in the opposite direction. The counting means, in turn, are connected in circuit with said converter means for receiving separately said first and second indicator signals and are capable of summing up additively said first indicator signals and subtractively said second indicator signals, whereby the position assumed by the moving object with reference to a starting position is indicated by the final sum of first and second indicator signals appearing as output of said counting device.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
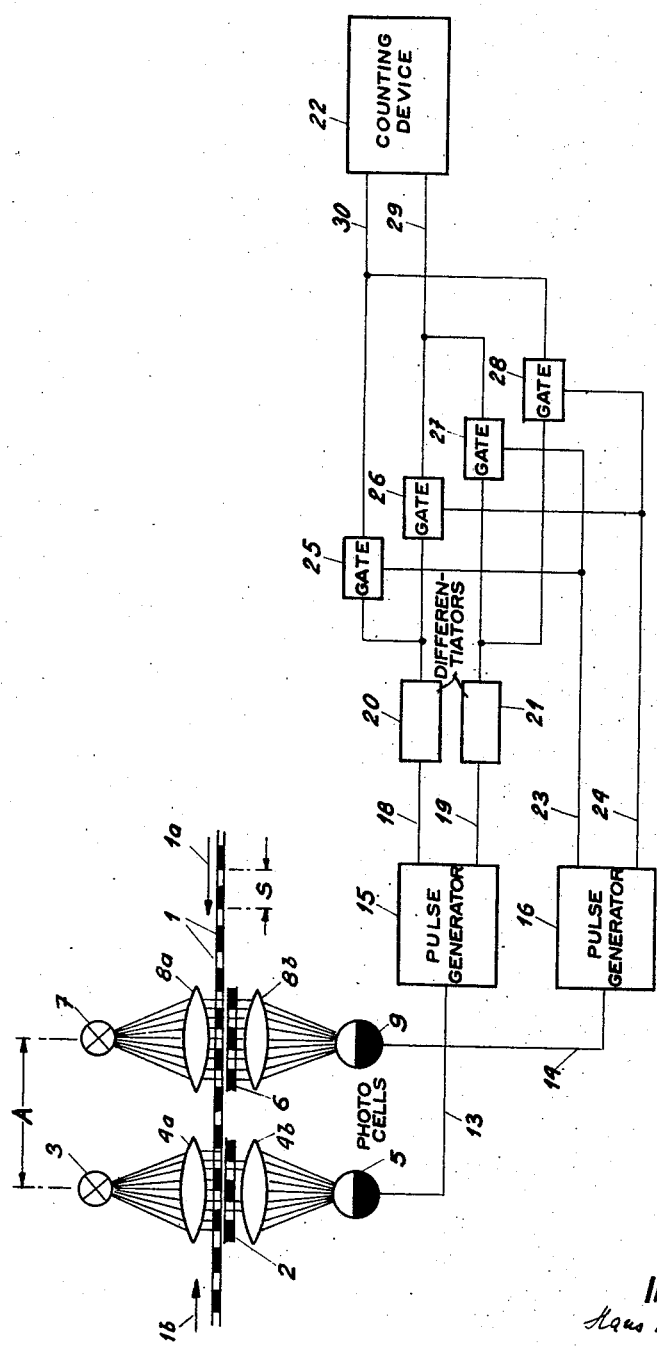
Fig. 1 is a diagrammatic illustration of the method and apparatus according to a preferred embodiment of this invention.

By way of example, the embodiment of the invention illustrated in Fig. 1 refers to a weighing scale having instead of, or in addition to, ordinary indicating means, a movable member carrying a dial or a scale composed of a series of signal elements 1, consisting of a number of such elements arranged equidistant from each other, for instance of a series of consecutive elements, alternatingly opaque and translucent, all having equal length and being evenly spaced from each other. Each opaque element together with one neighboring translucent spacing element occupy a unit length S of the member 1. This member 1 is movable in both directions longitudinally, and for the purpose of the following explanation may be assumed that in a weighing operation the member 1 would swing or move first in the direction of the arrow 1a, then swing back in direction of arrow 1b and possibly oscillate once or several times until it reaches a position of rest indicating the final result of the weighing operation.

Arranged adjacent to and along the movable member 1 are two similar scanning devices, one of which comprises a screen member 2, a source of light 3, a pair of lenses 4a and 4b and a photo-electric cell 5, while the second scanning device comprises a second screen member 6, a source of light 7, a pair of lenses 8a and 8b and a photo-electric cell 9.

It can be seen that the two screen members 2 and 6 are constructed in a manner corresponding to that of the scale member 1, namely so as to be provided with a series of consecutive elements, alternatingly opaque and translucent, all having equal length and being evenly spaced from each other. For obvious reasons, the dimensions of the elements of the screen members 2 and 6 are substantially identical with those of the corresponding elements of the scale member 1. As can be seen from Fig. 1, the translucent portions or elements of the scale member 1 may be wholly or partly in register with the translucent portions or elements of a screen member (which is shown by way of example in the case of screen member 2), or the translucent portions of the scale member 1 may be in register with the opaque portions of a screen (as is shown in the case of screen member 6). In the first case, the light emitted from the source 3 and passing through the translucent portions of scale member 1 and screen will generate in the cell 5 an electric signal of an intensity depending upon how much the corresponding translucent portions are in register with each other. In the second case, however, substantially no light from the source 3 or 7, whichever may be the case, will reach the associated cell 5 or 9, respectively, so that in this case no signal is generated.

Consequently, during a movement of the scale member 1 relative to the screen members 2 and 6, acting as a stationary reference mark, the signal elements on the scale member 1 acting as moving reference marks cause or generate a periodic sequence of electric pulses or signals corresponding exactly to the sequence of light pulses impinging on the photo-cells. Since preferably the scale member 1 carries a scale of uniform groups of opaque and translucent signal elements, each pair of one opaque and one translucent element occupying the width S, and since the screen members 2 and 6 are identically divided, the electric pulses or signals delivered by the cells 5 and 9, respectively, are exactly identical as far as the pulse duration and frequency are concerned. However, depending upon the selection of a certain spacing A between the two scanning devices in the longitudinal direction of the scale member 1, a phase difference of predetermined magnitude between the signals generated in the two cells can be arranged for. For instance, if the spacing A is made an integral multiple of the scale element S, then the phase difference between the two sequences of pulses or signals is zero. If, however, the spacing A is increased by a fraction of S, then a phase difference is created which, for instance amounts to one-half of a period if A is increased by ½ S.

Figure 2:
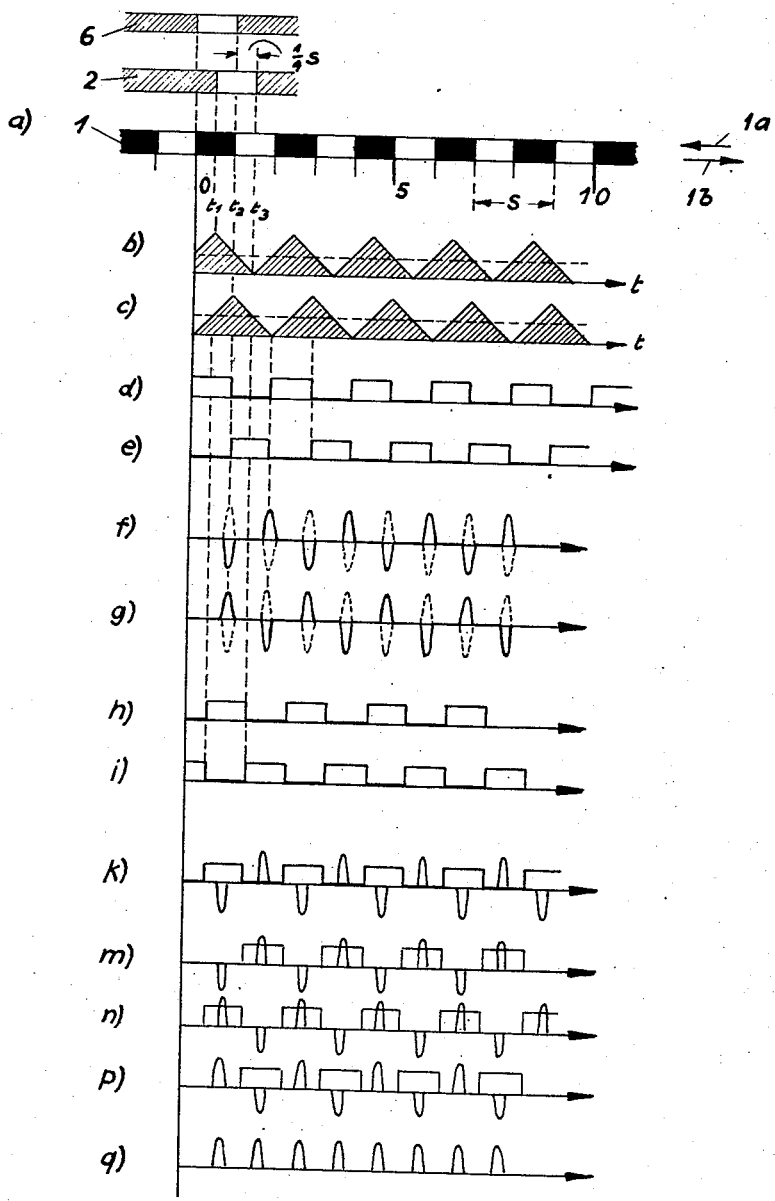
Fig. 2 is a diagrammatic illustration of the various steps occurring in the operation of the apparatus illustrated by Fig. 1.

Fig. 2 illustrates in the portion (a) thereof a portion of the scale member 1 and small portions of the screen members 2 and 6 arranged in a relative position not representative of their location in the apparatus, but suitable for the purpose of explanation of the procedure and operation in Fig. 2.

All the diagrams in lines (b) to (q) of this illustration illustrate the sequence of certain phenomena against time indicated along the abscissa of the diagram.

The line (b) shows the amounts of light transmitted through the screen member 2 to the cell 5 while the member 1 is moved in the direction of the arrow 1a. The amount of light corresponds to the shaded areas of triangular shape because the transmission varies obviously between a maximum when the translucent elements are in register and a minimum when one translucent and one opaque element are in register. When the scale member 1 and particularly its zero point 0 are in the position shown in Fig. 2, the cell 5 obtains one-half of the maximum amount of light because the translucent portion of the screen 2 is 50% out of register with the corresponding translucent portion of the scale member 1. The dotted line parallel with and above the abscissa coincident with the arrow $t$ indicates the level of 50% of maximum light intensity, and therefore the point in the diagram marking the above-described situation or condition is the intersection point between said dotted line and the ordinate in the zero point of the diagram.

As the movement of the scale member 1 in the direction of arrow 1a proceeds the light intensity increases as indicated by the triangular outline of the diagram, and reaches its maximum when the scale member 1 has been moved a distance ¼ S which corresponds to the time interval $t_1$, because now the translucent portions of screen 2 and member 1 are in register. After a further movement of the member 1 through a distance ¼ S the light intensity drops again to its 50% value identical with that corresponding to the starting position, and this second position is reached after a time interval $t_2$ counted from the beginning of the movement. When the time $t_3$ is reached, the light intensity is zero because now after another movement of the magnitude ¼ S an opaque and a translucent portion are in register.

It can be seen that the relationship between movement, light intensity and time illustrated in line (b) applies only for the movement of the scale member 1 in the direction of the arrow 1a. As can be seen in Fig. 2, line (a), a movement of member 1 in the opposite direction indicated by arrow 1b, the light intensity having the value of 50% of maximum in the zero position would drop to zero at the time $t_1$, from where it would rise again to its maximum which is reached at the time $t_3$. Consequently, the movement of the scale member 1 in direction 1b causes a periodic variation of the light intensity impinging on the cell 5 in such a manner that this variation has a phase difference of one-half of a period with respect to what happens in the case of a movement in the direction 1a. This phase difference corresponds to one-half of a scale postion S. For the sake of simplification of the illustration and description, all those phenomena characteristic of movement of the member 1 in direction 1a are shown in full lines, while those referring to movement in direction 1b are shown in dotted lines.

In the position shown in line (a) the screen member 6 is in a position shifted by ¼ S against that of the screen 2. Of course, in an apparatus the distance or spacing A between the two scanning devices will be actually an integral multiple of the scale portion S plus the above-mentioned shift so that $A = n \cdot S + \frac{1}{4} S$. The amount of light impinging on the cell 9 is therefore equal to zero when the scale member 1 is in the zero position shown in Fig. 2 because the translucent portion of screen 6 is completely out of register with any one translucent portion of member 1. Therefore, movement of the member 1 in direction 1a results in a variation of light intensity impinging on cell 9 as shown in line (c), which is to be interpreted exactly in the same manner as line (b). Assuming that the characteristic indicating the relation between voltage output and quantity of light received, of the photo-electric cells 5 and 9 is substantially linear, then the sequence of electric pulses fed by the cells into the lines 13 and 14, respectively, of Fig. 1 correspond exactly to the change of light intensity indicated by the triangular outline of the diagrams (b) and (c) of Fig. 2. These electric pulses are necessarily direct current pulses of varying intensity and are characterized by a phase difference amounting to one-quarter of a period as indicated by lines (b) and (c). It will be understood that such sequences of direct current pulses are not well suited for the purpose of this method and apparatus. It is much more promising to cause these pulses to appear in the lines 13 and 14 rather than in the form of an alternating current which can be achieved in a manner known per se by means of a suitable compensation circuit arrangement. Then, the lines 13 and 14 will carry each a sequence of periodical signal pulses of alternatingly changing polarity with reference to zero voltage indicated by the above-mentioned dotted line in the diagrams (b) and (c), the periodic signals being of course shifted against each other at a phase difference amounting to one-quarter of a period.

The sequence of signals furnished through the line 13 is fed into a generator 15 capable of generating rectangular pulses and of converting the sequence of signals illustrated by line (b) into two sequences of rectangular pulses as illustrated by the diagram lines (d) and (e), one of which pulse sequences appears in the output line 18 and the other one in the output line 19. It will be noted that the duration of each of said pulses is substantially equal to one-half of a period, and that the two sequences of rectangular pulses shown in lines (d) and (e) are offset against each other by a phase difference amounting also to one-half of a period. These pulses are all positive. The duration of these pulses is actually determined by the time when the signal voltage in the line 13—illustrated by line (b)—passes through zero, while the steepness of the flanks of the pulses is independent of the time factor because these pulses are rectangular in shape by definition. Therefore, the speed of movement of the scale member 1 determines only the duration of the individual pulses.

Figure 3:
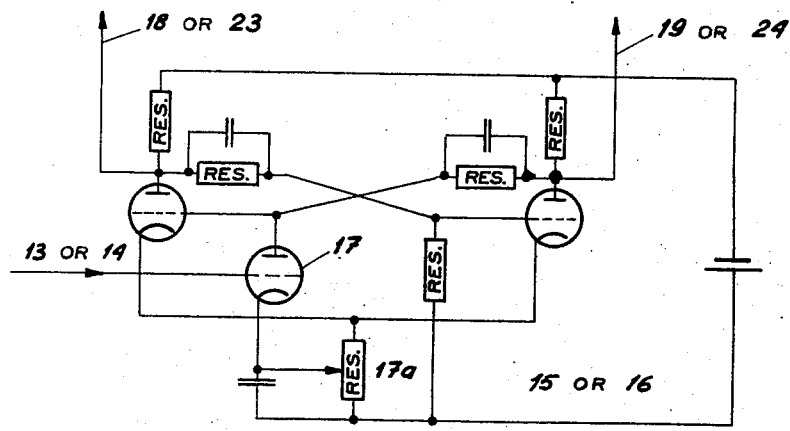
Figs. 3 and 4 are circuit diagrams illustrating several components of the apparatus illustrated in Fig. 1 only in block form.
Figure 4:
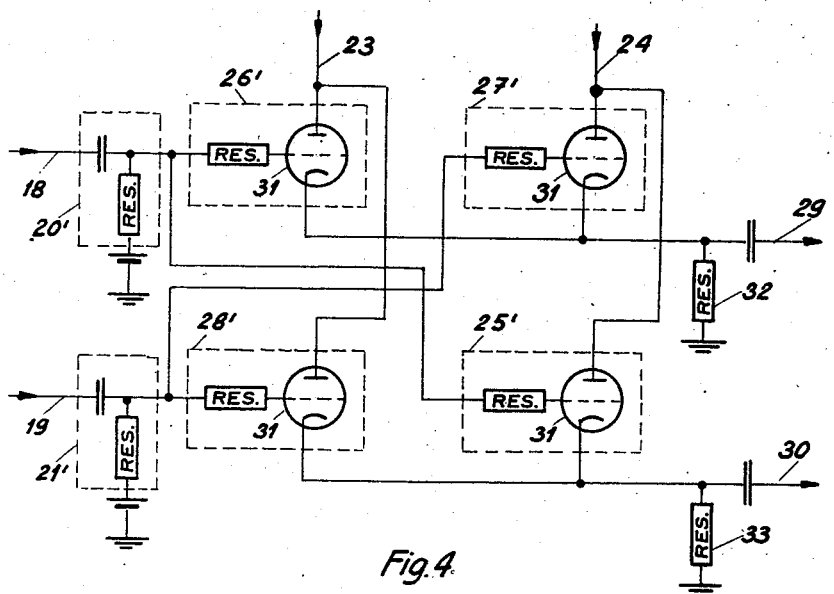

In the same manner, the sequence of signals illustrated by diagram line (c) is supplied through line 14 and is converted by the generator 16 into two rectangular pulse sequences illustrated by lines (h) and (i) which appear separately in the output lines 23 and 24, respectively, and are also positive and show a phase difference relative to each other amounting to one-half of a period. Since the duration of the rectangular pulses appearing in the lines 23 and 24 is determined by the passing of the signal voltage in line 14 through zero and since there is a phase difference of ¼ S between the signal sequences shown in lines (b) and (c), the sequences of rectangular pulses in the lines 18 and 23—as shown in lines (d) and (h)—as well as those appearing in the lines 19 and 24—as shown in lines (e) and (i)—have the same phase difference amounting to ¼ S. As an example, a suitable rectangular pulse generator, as indicated by the blocks 15 and 16, respectively, in Fig. 1, is illustrated by the circuit diagram of Fig. 3. This diagram is the illustration of a conventional flip-flop relaxation circuit with two stable conditions (as for instance the so-called Eccles-Jorden circuit) and is generally known. This circuit is switched back and forth by trigger pulses appearing at the tube 17 whenever the voltage in the lines 13 and 14, respectively, connected to the grid of the tube changes from positive to negative potential or vice versa. A variable cathode resistor 17a in circuit with the tube 17 permits a certain adjustment of the potential of the grid of the tube 17 which is needed for the switching operation so that in this manner possible unbalances between the amplitudes appearing above and below the dotted line in the signal sequence according to lines (b) and (c) can be compensated, and that the allowance permitted for fixing the indication of zero within the individual scale portions can be adjusted to existing requirements. As can be seen from Fig. 1, the two lines 18 and 19 in which the pulse sequences according to lines (d) and (e), respectively, appear are connected with differentiating devices 20 and 21, respectively, which may be constituted by a resistor-capacitor circuit as shown in Fig. 4 and indicated by 20' and 21', respectively. As is well known, such differentiating means are capable of converting the front flank of a rectangular pulse into a positive pulse peak and of converting the trailing flank of such a pulse into a negative pulse peak. Consequently, a sequence of pulses as shown by the line (f) of Fig. 2 appears at the output of the differentiating means 20 while the pulse sequence shown by line (g) appears at the output of the differentiating means 21, whenever the pulse sequences according to lines (d) and (e) appear in the lines 18 and 19, respectively. The pulse peaks shown in full lines correspond to a movement of the scale member 1 in direction 1a. If the movement is in the direction 1b then sequences of pulses are produced which are, however, offset by a phase difference of 180° against those shown in lines (b) and (d). Consequently, in this case pulse peaks as shown in dotted lines in lines (f) and (g) appear on the output side of the differentiating means 20 and 21, respectively, which are offset 180° in phase with respect to the pulse peaks shown in full lines.

The pulse peaks appearing at the output of the differentiating means 20 are fed, as can be seen in Fig. 1, to the input of the two gate means 25 and 26. The pulse peaks appearing at the output of the differentiating means 21 are supplied to the electronic gate means 27 and 28. The gate means which are ordinarily blocked for not permitting the passage of the above-mentioned pulse peaks, are connected parallel in pairs, i.e. the outputs of the gate means 26 and 27 are connected to the line 29 while the outputs of the gate means 25 and 28 are connected to the line 30. The gate means 25 and 28 are unblocked by the rectangular pulses produced in the generator 16 for a duration of one pulse and thereby they are opened for those pulse peaks which appear during this moment at their inputs, respectively. The unblocking of the gate means 25 and 27 is effected via line 23, i.e. by means of the sequence of rectangular pulses shown in the diagram line (h). In the same manner, the gate means 26 and 28 are opened via the line 24, i.e. by means of the rectangular pulse sequences illustrated by lines (i).

The controllable gate means 25 to 28 are illustrated in greater detail in Fig. 4 by way of example. In this embodiment the gate means 25' to 28' comprise each a three-electrode tube 31. The control circuits of the gate means 25' and 26' are so connected that the control grid and a series-resistance of each thereof are connected in parallel with each other, and they obtain through the resistor of the series-connected differentiating member 20' such a negative bias voltage that only the positive pulse peaks appearing at the control grid are capable of influencing these ordinarily blocked gate means. The tubes 31 of the gate means 25' and 26', however, are only supplied with an anode potential when a rectangular pulse appears in the line 24 or 23, respectively, so that they are only during this time open for permitting the passage of the positive pulses appearing at the control grids thereof and to transmit the latter to the lines 30 and 29, respectively. In the same manner, the gate means 27' and 28' are connected with their control grids and series-resistance in parallel with each other and obtain via the resistor in the series-connected differentiating means 21' such a negative bias voltage that only the positive pulse peaks appearing at their control grids are capable of influencing the ordinarily blocked gate means. The tubes 31 of the gate means 27' and 28' are not supplied with an anode potential except when a rectangular pulse appears in the lines 24 and 23, respectively, so that they are only during such a period open for the positive pulse peaks appearing at their control grids, respectively, and capable to transmit these peaks to the lines 29, 30, respectively.

The above described arrangement of the gate means results in permitting the positive pulse peaks derived from a movement of the scale member in direction $1a$ to arrive only in the line 29. For instance, the line $(k)$ of Fig. 2 shows the rectangular control pulses shown in line $(h)$ which serve to open the gate means 25 and which depend regarding their duration only on the speed of movement and division of the scale member 1 into scale elements; the same line $(k)$ shows the pulse peaks appearing at the input of the means 25 and illustrated in line $(f)$, in corresponding time relationship. This shows that the pulse peaks can only arrive in line 30. The corresponding conditions concerning gate means 26 are shown by line $(m)$ which illustrates that the positive pulse peaks shown by line $(f)$ appear during the period in which the opening pulses shown by line $(i)$ appear so that said positive peaks can be transmitted to the line 29. In the same manner, as is shown in the line $(n)$, the gate means 27 obtains the positive pulse peaks shown in line $(g)$ during the duration of the opening pulses shown in line $(h)$ so that said pulse peaks are transmitted likewise to the line 29. At the input of gate means 28 however, positive pulse peaks as shown in line $(g)$ appear only during the intervals between the opening pulses shown by line $(i)$ so that they cannot arrive at the line 30. Consequently the positive pulses coming from the gate means 26 and 27 are added in the line 29 to the continuous sequence of pulses as illustrated by line $(q)$ while no pulses at all appear in the line 30.

On the other hand, for analogous reasons, in the case of a movement of the scale member 1 in direction $1b$ no pulse peaks arrive in the line 29 but the pulse peaks appear only on the line 30.

The sequences of pulses in the lines 29 or 30, no matter in which they appear, show for every scale element of the scale member 1 a sharp distinct pulse, only the spacing between pulses, but not the shape or the amplitude of the pulses depending upon the velocity of the movement of the member 1. Therefore the impulses appearing in the lines 29 and 30 are well suited to be used as counting pulses for signalling or indicating the actual positions of the member 1. For instance, if the scale on the member 1 is provided with 1,000 divisions, i.e., 500 translucent and 500 opaque scale elements, and if such a scale would move during a weighing operation from zero position in direction of arrow $1a$ up to a position corresponding to 750 divisions of the scale, and if it would then swing back to a position corresponding to 685 divisions and finally come to rest in a position corresponding to 700 divisions counted from the zero point, then first in the line 29 exactly 750 pulses would appear, after that exactly 65 pulses in line 30 and finally 15 pulses again in the line 29. The algebraic sum of all these pulses is the result of the weighing operation that is to be shown namely a number of pulses obtained by the additive and subtractive summing up as follows:

$$750 - 65 + 15 = 700$$

The algebraic summation of the pulses appearing in the lines 29 and 30 is effected in the counting device 22, each pulse arriving in the line 29 being treated as positive and all pulses arriving in the line 30 being treated as negative. Of course, the pulses arriving in both lines are electrically of positive potential. Counting devices of this type are entirely conventional and well known, as for instance a stepping mechanism which is moved by pulses arriving through line 29 in one direction and by pulses arriving through line 30 in the opposite direction. Also electronic counting devices operating in both forward and backward directions are known and operate by being supplied at one input terminal with pulses for addition and at another input terminal with pulses for subtraction. A detailed description of any such counting device appears to be unnecessary.

It will be understood that a method and apparatus as described above is extremely convenient in connection with many measuring devices, particularly weighing scales, because for instance the position of the zero point can be adjusted easily and tare can be applied easily.

The description of the preferred embodiment of the invention is based on the use of a scale member having scale elements being all equidistant from each other, i.e., a uniform division of the scale over the entire measuring range. However, the above described method and apparatus is quite as well useful in connection with a scale member having a non-uniform division. Furthermore, it should be understood that the circuit diagrams are only intended to illustrate the principal features of the particular circuit because those skilled in the art will easily understand the operation thereof even if conventional elements like current limiters, amplitude limiters, amplifiers, etc., are omitted.

It will be understood that each of the elements described above, or two or more together, may also find a useful application in other types of methods and apparatus for signalling values differing from the types described above.

While the invention has been illustrated and described as embodied in methods and apparatus for signalling the positions of a moving object, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for signaling the position of a moving object, particularly of a member of a measuring device, comprising, in combination, a carrier member coupled with the movable member for movement jointly therewith and carrying a single series of uniformly spaced reference marks lined up along a line extending substantially in the direction of said movement; first and second stationary scanning means located adjacent to said carrier member for independently but simultaneously scanning said series of reference marks during their movement both in one and the opposite directions, each of said scanning means being capable of producing an electric signal pulse for each of said reference marks consecutively sensed during said movement, said scanning means being spaced from each other in said direction of movement a distance substantially equal to an integer multiple plus one quarter of the spacing of said reference marks so that pulses produced by one of said scanning means are offset one-quarter of a pulse period against the pulses produced by the other scanning means; a first flip-flop relaxation circuit means in circuit with said first scanning means for being biased by said signal pulses therefrom, and a second flip-flop relaxation circuit in circuit with said second scanning means for being biased by said signal pulses from the latter, said relaxation circuit means having two stable conditions depending upon biased and unbiased condition, respectively, and being capable of producing and of delivering in one and the other condition, respectively, in response to said signal pulses, at a first and second output, respectively, two separate sequences of positive rectangular indicating pulses having each a duration of one-half of a pulse period, the indicating pulses in one of said sequences being offset one-half of said pulse period against the indicating pulses in the other one of said sequences; first and second differentiating means in circuit with one of said relaxation circuit means for converting said sequences of indicating pulses, respectively, into sequences of positive pulse peaks corresponding to the front flank of the respective rectangular pulses and into sequences of negative pulse peaks corresponding to the trailing flank of the respective rectangular pulses; pulse counting means capable of summing additively and subtractively and having separate adding and subtracting inputs for pulses to be added and for pulses to be deducted, respectively, in the summing operation; and gate means connected between said differentiating means and said counting means, said gate means comprising a first gate means connected between the output of the first differentiating means and said adding input, and connected for control with the first output of the other relaxation circuit means, a second gate means connected between said output of said first differentiating means and said subtractive input, and connected for control with the second output of said other relaxation circuit means, a third gate means connected between the output of said second differentiating means and said subtracting input, and connected for control with said first output of said other relaxation circuit means, and a fourth gate means connected between said output of said second differentiating means and said adding input, and connected for control with said second output of said second relaxation circuit means.

2. Apparatus for signaling the position of a moving object, particularly of a member of a measuring device, comprising, in combination, a carrier member coupled with the movable member for movement jointly therewith and carrying a single series of uniformly spaced reference marks lined up along a line extending substantially in the direction of said movement; first and second stationary scanning means located adjacent to said carrier member for independently but simultaneously scanning said series of reference marks during their movement both in one and the opposite directions, each of said scanning means being capable of producing an electric signal pulse for each of said reference marks consecutively sensed during said movement, said scanning means being spaced from each other in said direction of movement a distance substantially equal to an integer multiple plus one quarter of the spacing of said reference marks so that pulses produced by one of said scanning means are offset one-quarter of a pulse period against the pulses produced by the other scanning means; first and second converter means each having a first and a second output and connected respectively in circuit with said first and second scanning means for converting a sequence of said signal impulses into two sequences of positive rectangular indicating pulses having the same pulse spacing as said signal pulses, one of said sequences of rectangular indicating pulses being offset against the other sequence of indicating pulses by one-half of said pulse period; first and second differentiating means in circuit with one of said converter means for converting said sequences of indicating pulses, respectively, into sequences of positive pulse peaks corresponding to the front flank of the respective rectangular pulses and into sequences of negative pulse peaks corresponding to the trailing flank of the respective rectangular pulses; pulse counting means capable of summing additively and subtractively and having separate adding and subtracting inputs for pulses to be added and for pulses to be deducted, respectively, in the summing operation; and gate means connected between said differentiating means and said counting means, said gate means comprising a first gate means connected between the output of the first differentiating means and said adding input, and connected for control with the first output of the other converter means, a second gate means connected between said output of said first differentiating means and said subtractive input, and connected for control with the second output of said other converter means, a third gate means connected between the output of said second differentiating means and said subtracting input, and connected for control with said first output of said other converter means, and a fourth gate means connected between said output of said second differentiating means and said adding input, and connected for control with said second output of said second converter means.

References Cited in the file of this patent

UNITED STATES PATENTS

| | | |
|---|---|---|
| 2,537,427 | Seid et al. | Jan. 9, 1951 |
| 2,656,106 | Stabler | Oct. 20, 1953 |
| 2,796,598 | Cartwright | June 18, 1957 |